(12) United States Patent
Maiolo

(10) Patent No.: US 10,213,854 B2
(45) Date of Patent: Feb. 26, 2019

(54) BAND SAW BLADE

(71) Applicant: IRWIN INDUSTRIAL TOOL COMPANY, Huntersville, NC (US)

(72) Inventor: Joseph F. Maiolo, Chicopee, MA (US)

(73) Assignee: IRWIN INDUSTRIAL TOOL COMPANY, Huntersville, NC (US)

(*) Notice: Subject to any disclaimer, the term of this patent is extended or adjusted under 35 U.S.C. 154(b) by 7 days.

(21) Appl. No.: 15/350,760

(22) Filed: Nov. 14, 2016

(65) Prior Publication Data

US 2018/0133820 A1 May 17, 2018

(51) Int. Cl.
*B23D 61/12* (2006.01)
(52) U.S. Cl.
CPC .................... *B23D 61/121* (2013.01)
(58) Field of Classification Search
CPC ..... B23D 61/121; B23D 61/125; B23D 61/14
See application file for complete search history.

(56) References Cited

U.S. PATENT DOCUMENTS

| | | | | |
|---|---|---|---|---|
| 4,423,653 A * | 1/1984 | Howard | ............... | B23D 55/088 83/661 |
| 5,410,935 A * | 5/1995 | Holston | ............... | B23D 61/121 83/835 |
| 6,276,248 B1 | 8/2001 | Cranna | | |
| 8,113,100 B1 | 2/2012 | Cranna et al. | | |
| 2016/0008899 A1 * | 1/2016 | Hunter | ................. | B23D 61/121 83/849 |

FOREIGN PATENT DOCUMENTS

| | | | | |
|---|---|---|---|---|
| CA | 2415816 A1 * | 1/2002 | ........... | B23D 61/121 |
| CN | 105 945 357 A | 9/2016 | | |
| EP | 2 322 304 A1 | 5/2011 | | |
| EP | 2 602 042 A1 | 6/2013 | | |
| GB | 622 601 A | 5/1949 | | |

OTHER PUBLICATIONS

Extended European Search Report issued in Application No. 17201051, dated Mar. 20, 2018, 8 pages.

* cited by examiner

*Primary Examiner* — Omar Flores Sanchez
(74) *Attorney, Agent, or Firm* — Eversheds Sutherland (US) LLP

(57) ABSTRACT

A band saw blade can include a blade body having a longitudinally extending back edge along one side and a cutting edge defined by multiple teeth on an opposing side of the blade body. Each tooth can have tip, a rake face disposed along the front side of the tooth, and a relief surface disposed along the opposing rear side of the tooth. A gullet can be disposed between each pair of teeth and can extend from the rake face of one tooth to the relief surface of the next adjacent tooth in the cutting direction. A notch can be defined by the junction of the rake face and the gullet. The rake face can be disposed at a positive angle and with the notch can promote the movement of swarf generated by the tip cutting a work piece into the gullet.

20 Claims, 6 Drawing Sheets

BAND SAW BLADE

TECHNICAL FIELD

Embodiments disclosed herein are generally related to saw blades, and more particularly, to wood cutting band saw blades having a tooth form configured to reduce saw dust passing to the kerf walls and to the side walls of the band saw blade.

BACKGROUND

It is desirable to minimize the amount of sawdust remaining between the boards sawn with a wood-cutting band saw blade when cutting work pieces. In addition, saw dust can be particularly problematic when cutting frozen wood, such as logs and other wood forms. In particular, the teeth of the fast-moving band saw blade create friction during the cutting operation that, in turn, heats the wood and allows the wood to release moisture. The moisture collects on the kerf walls of the lumber being sawn. This build-up of moisture can bind with the sawdust thereon into a glue-like mixture. Then, the glue-like mixture freezes between the sawn boards when the blade exits the work piece, resulting in a frozen, hardened layer of saw dust on the side walls of the lumber. Moisture can and will mix with the saw dust and be redeposited along the cut portions of the sawn boards. The dust and moisture mixture can refreeze in the area of the cut after the saw blade completes the cutting operation, allowing the sawn boards to refreeze back together.

Certain conventional band saw blades have attempted to correct this issue by placing certain features along the rake face, relief surface, and or gullet of the teeth in the band saw blade. However, this can have certain drawbacks as well. For example, these features can limit or outright prevent the user from re-sharpening the teeth of the band saw blade, as the sharpening process can reduce or eliminate the effectiveness of these dust collection features. Many users of wood-cutting band saw blades believe it is desirable to maximize the useful life of these types of band saw blades by re-sharpening the teeth of the blade at certain times or in certain intervals. Accordingly, providing a wood-cutting band saw blade that is both re-sharpenable and has dust directing features would solve multiple issues for users of these types of blades.

BRIEF DESCRIPTION OF THE EXAMPLE DRAWINGS

For a more complete understanding of the present disclosure and certain features thereof, reference is now made to the following description, in conjunction with the accompanying figures briefly described as follows.

DETAILED DESCRIPTION OF THE EXAMPLE EMBODIMENTS

Figure 1:
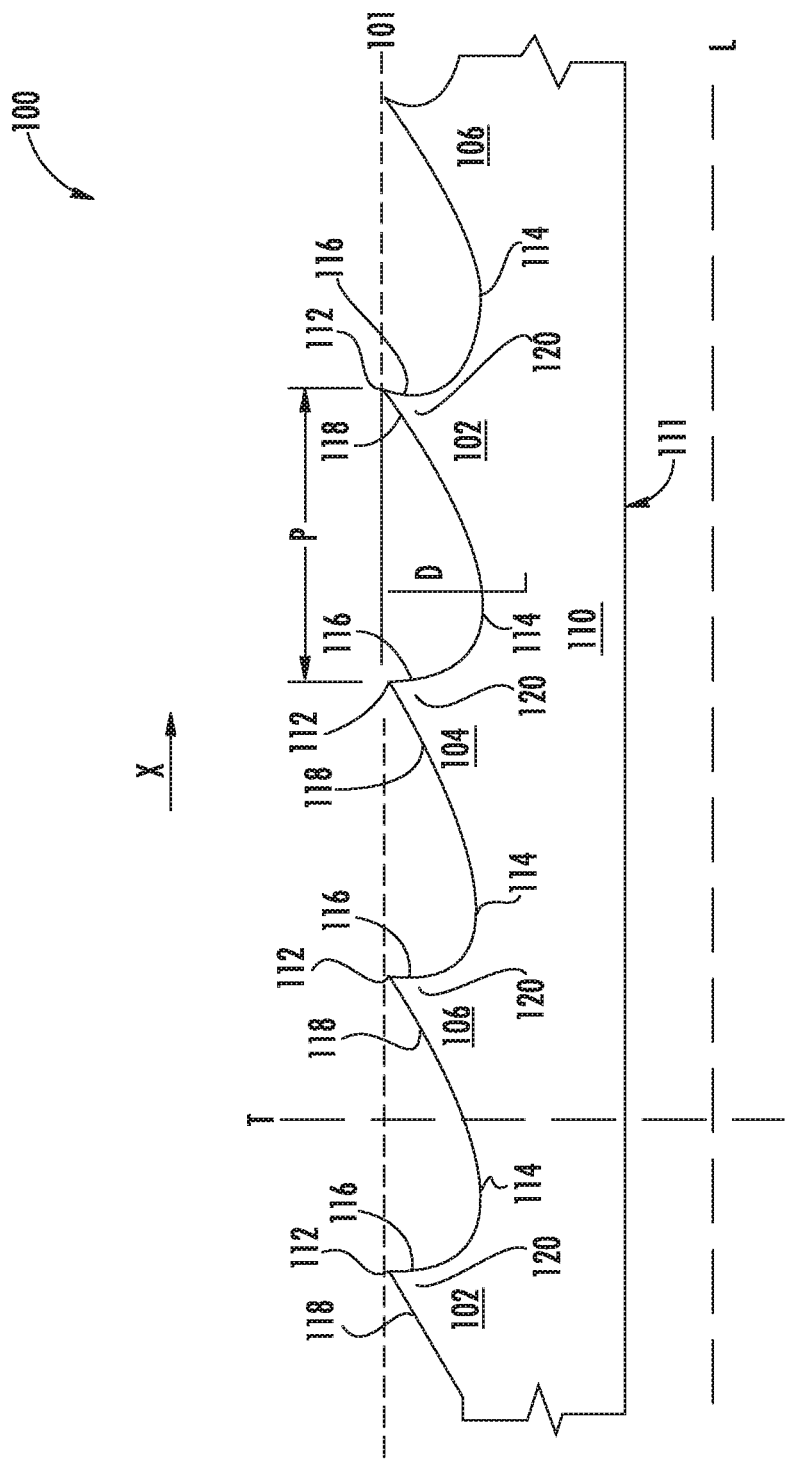
FIG. 1 is a partial side elevation view of a wood-cutting band saw blade according to one example embodiment of the disclosure.

Example embodiments of the invention now will be described more fully hereinafter with reference to the accompanying drawings, in which example embodiments are shown. The concept disclosed herein may, however, be embodied in many different forms and should not be construed as limited to the exemplary embodiments set forth herein; rather, these embodiments are provided so that this disclosure will be thorough and complete, and will fully convey the scope of the invention to those skilled in the art. Like numbers refer to like, but not necessarily the same, elements throughout.

The example embodiments described herein and shown in the figures are described with reference to a band saw blade having multiple teeth. While the example embodiments will generally be described with reference to a wood-cutting band saw blade, the reference to the band saw blade being used for cutting wood is for example purposes only, as the tooth formations and arrangements described herein can be incorporated into other types of band saw blades that are used to cut other types of materials including, but not limited to, metals, alloys, plastics, etc. Each of the other forms of material cutting band saw blades should individually be read as an alternative embodiment to the wood-cutting band saw blade described below.

Certain dimensions and features of the example band saw blade are described herein using the term "approximately." As used herein, the term "approximately" indicates that each of the described dimensions is not a strict boundary or parameter and does not exclude functionally similar variations therefrom. Unless context or the description indicates otherwise, the use of the term "approximately" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

In addition, certain relationships between dimensions of the band saw blade and between features of the band saw blade are described herein using the term "substantially." As used herein, the term "substantially" indicates that each of the described dimensions is not a strict boundary or parameter and does not exclude functionally similar variations therefrom. Unless context or the description indicates otherwise, the use of the term "substantially" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

Further, certain relationships between dimensions of the band saw blade and between features of the band saw blade are described herein using the term "substantially equal". As used herein, the term "substantially equal" indicates that the equal relationship is not a strict relationship and does not exclude functionally similar variations therefrom. Unless context or the description indicates otherwise, the use of the term "substantially equal" in connection with two or more described dimensions indicates that the equal relationship between the dimensions includes variations that, using mathematical and industrial principles accepted in the art (e.g., rounding, measurement or other systematic errors, manufacturing tolerances, etc.), would not vary the least significant digit of the dimensions. As used herein, the term "substantially constant" indicates that the constant relationship is not a strict relationship and does not exclude functionally similar variations therefrom. As used herein, the term "substantially parallel" indicates that the parallel relationship is not a strict relationship and does not exclude functionally similar variations therefrom.

A band saw blade is a form of saw blade that includes a long sharp blade that can include a continuous band of toothed metal rotating on opposing wheels to cut material. Band saw blade may be used in cutting wood, metal, alloys, ceramics, composites and other materials. Advantages of using a band saw and band saw blade can include uniform cutting action as a result of an evenly distributed tooth load, and the ability to cut irregular or curved shapes.

FIG. 1 presents a partial side elevation view of a band saw blade 100 according to one example embodiment of the disclosure. In one example, the band saw blade is a wood-cutting band saw blade. Referring now to FIG. 1, the example band saw blade 100 includes a band 110 or blade body 110. The band saw blade 100 defines a longitudinal axis L and a transverse axis T. The blade body 110 can include a first end 111 and an opposing second end. The first end 111 can be the back or bottom edge of the blade body 110. The second end of the blade body 110 can include or be coupled to a cutting edge 101 defined by multiple saw teeth 102-106. In certain example embodiments, the blade body 110 and the saw teeth 102-106 can be made from a single piece of material. In another example embodiment, the blade body 110 and the saw teeth 102-106 can be made from different materials and the saw teeth 102-106 can be welded or otherwise coupled to the second end of the blade body 110 during the manufacturing process. In example embodiments where the blade body 110 and saw teeth 102-106 are made from different materials, the blade body 110 can be made from a spring steel alloy and the saw teeth 102-106 can be made from high-speed steel. However, the materials described are for example purposes only, as other materials may be substituted for the spring steel alloy and or the high-speed steel depending on cost and use factors.

While the example band saw blade 100 shows five saw teeth, this is for example purposes only. A complete band saw blade will include more than seven teeth. However, the teeth 102-106 are provided to show one example embodiment of a repeating pattern of saw teeth 102-106, which would continuously repeat in the order shown along the length of the blade body 110 of the band saw blade 100. Each tooth 102-106 can include a tip, a rake face, and one or more relief surfaces extending from the tip in a direction opposite to the saw blade's cutting direction, X. In one example, all of the tips of all of the teeth of the saw blade 100 can be at the same height. Providing teeth on the saw blade that all extend to a tip of the same height can allow for more consistent wear of all of the teeth on the band saw blade 100. In addition, providing teeth on the saw blade 100 that all extend to a tip of the same height (e.g., all of the teeth are disposed along a single cutting plane) can reduce the stress per tooth, as all of the teeth are cutting the material to be cut in the same plane. Providing teeth on the band saw blade 100 that all extend to a tip of the same height also aids by reducing the binding during cutting that can be caused by teeth that extend up vertically higher than other teeth in the pattern catching in the material to be cut and causing the band saw blade 100 to bind. Providing teeth on the band saw blade 100 that all extend to a tip of the same height also can reduce tooth loss/break off during use and can reduce the likelihood of the taller teeth binding while cutting during use of the band saw.

Figure 2:
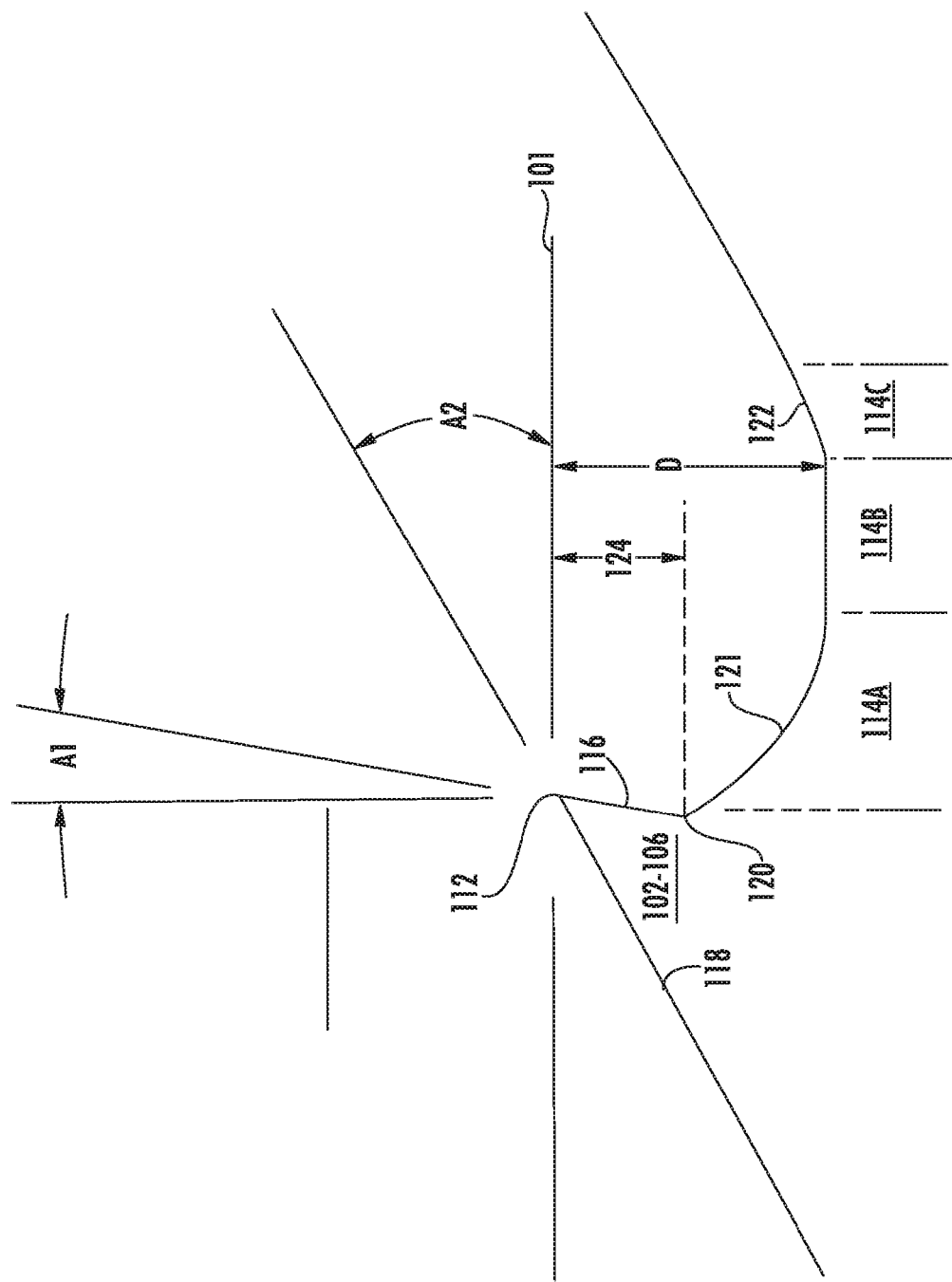
FIG. 2 is a partial side elevation view of a saw blade tooth used in conjunction with the wood-cutting band saw blade of FIG. 1 according to one example embodiment of the disclosure.
Figure 3:
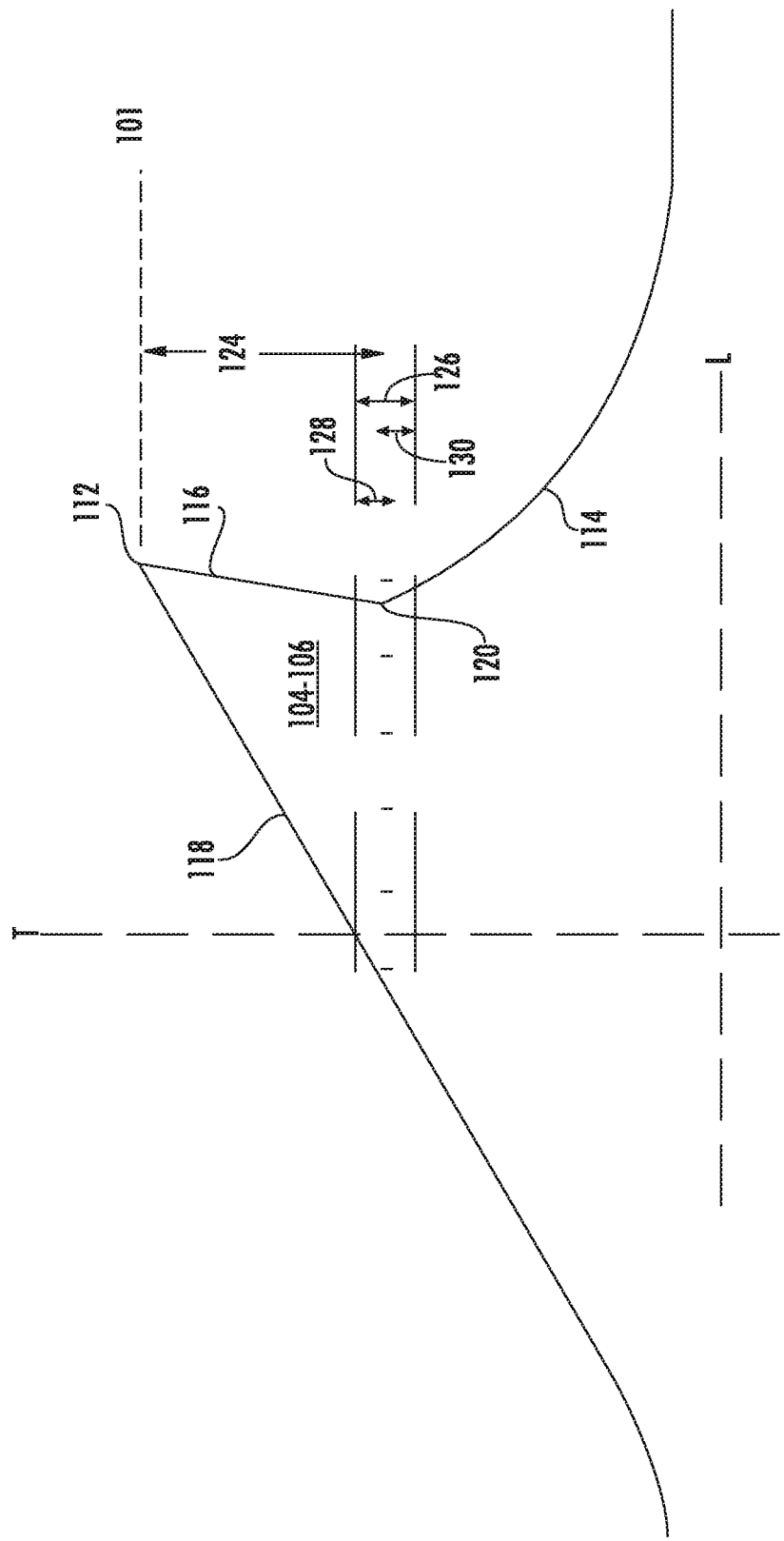
FIG. 3 is another partial side elevation view of the saw blade tooth used in conjunction with the wood-cutting band saw blade of FIG. 1 according to one example embodiment of the disclosure.

FIGS. 2 and 3 present partial side elevation views of an example saw blade tooth 102-106 used in conjunction with the band saw blade 100 of FIG. 1. Now referring to FIGS. 1-3, each saw blade tooth 102-106 can include a tooth tip 112, a rake face 116, and a relief surface 118. While the example embodiment of FIGS. 1-3 shows a single relief surface 118, in other example embodiments, each tooth 102-106 can have multiple relief surfaces 118, each disposed at a different angle to the horizontal. In certain example embodiments, the distance from the bottom edge 111 of the blade body 110 to the tooth tip 112 is substantially 3 inches or less and more preferably substantially 2 inches or less. For example, the distance from the bottom edge 111 of the blade body 110 to the tooth tip 112 of each tooth 102-106 can be any one of substantially 2 inches, substantially 1.50 inches, substantially 1.25 inches, or substantially 1 inch.

The teeth 102-106 are spaced along the cutting edge 101 with the tip 112 of one tooth (e.g., first tooth 102) and the tip 112 of the next consecutively disposed tooth (e.g., second tooth 104) cooperating to define a pitch distance P. For example, as shown in FIG. 1, the distance between the tip 112 of the first tooth 102 and the tip 112 of the second tooth 104 can have the pitch distance of P. In one example embodiment, the pitch distance P or tooth pitch P is substantially constant between each pair of teeth tips 112 for the entire band saw blade 100 and can be anywhere between substantially 0.375 inches to substantially 2 inches and more preferably anywhere between substantially 0.500 inches to substantially 1 inch. In certain examples, the pitch distance P is constant and can be any one of substantially 0.500 inches, substantially 0.750 inches, substantially 0.875 inches, and substantially 1 inch for the entirety of the band saw blade 100.

A curvilinear base surface or gullet 114 extends between the rake face 116 of one tooth 102-106 and the relief surface 118 of the next consecutive tooth 102-106 in front of the one tooth in the cutting direction X. Each gullet 114 has a gullet depth D, which is measured as the vertical difference or distance from the tip 112 of the following tooth (as viewed from the cutting direction X) to the lowest point of the gullet 114. In one example, the gullet depth is the same or constant for all teeth 102-106 of the band saw blade 100. In certain example embodiments, the gullet depth D is a function of the pitch distance P between tooth tips 112. For example, the gullet depth D can be anywhere in the range of substantially (0.30*P) to substantially (0.36*P) and more preferably anywhere in the range of substantially (0.31*P) to substantially (0.34*P). For example, for a band saw blade 100 having a pitch distance P of 1 inch, the gullet depth D can be in the range of substantially 0.30 inches to substantially 0.36 inches and more preferably anywhere in the range of substantially 0.31 inches to substantially 0.34 inches.

In certain example embodiments, the gullet 114 can be defined by three separate sections. The first section 114A can be curved and have a radius, R1. The first section 114A can have a first end that is adjacent a bottom end of the rake face 116 and an opposing second end and extends from the first end in a curved manner towards the relief surface 118 of the next consecutive tooth 102-106 in front of the one tooth in the cutting direction X. The gullet can further include a second section 114B that is flat or substantially flat. The second section 114B can have a first end disposed at the second end of the first section 114A and a distal second end that extends from the first in a linear or substantially linear manner towards the relief surface 118 of the next consecutive tooth 102-106 in front of the one tooth in the cutting direction X. In one example embodiment, the second section is horizontal or substantially horizontal and parallel or substantially parallel with the back edge 111 of the blade body 110. The gullet 114 can further include a third section 114C having a first end and a distal second end. The third section 114C can be curved and have a radius, R2. In one example embodiment, the radius R2 is greater than the radius R1. In other example embodiments, the radius R2 can be equal to or less than the radius R1. The first end of the third section 114C can be disposed at the second end of the second section 114B and extend to the second end where it abuts the relief surface 118 of the next consecutive tooth 102-106 in front of the one tooth in the cutting direction X.

The example rake face 116 of the band saw blade 100 can be a linear surface that extends generally downward from the tooth tip 112 generally along the front face of the tooth 102-106. In one example embodiment, the length of the rake face 116 between the tooth tip 112 and the point where the rake face 116 meets the first section 114A of the gullet 114 can be a function of the gullet depth D. For example, the length of the rake face can be anywhere in the range of substantially (0.536*D) to substantially (0.584*D) and more preferably anywhere in the range of substantially (0.555*D) to substantially (0.567*D). In one example embodiment, the rake face 116 defines a rake angle A1 measured from a plane extending perpendicular to the cutting direction X of the band saw blade 100 (or between the tips of consecutively disposed teeth). In certain example embodiments, the rake angle A1 can be a positive rake angle and can be anywhere in the range of between substantially 5 degrees and substantially 15 degrees and preferably between substantially 7 degrees and substantially 12 degrees, and more preferably substantially 10 degrees.

A notch 120 is positioned along the front side of each tooth 102-106. In one example embodiment, the notch 120 is positioned at the intersection of the rake face 116 and the gullet 114. For example, the notch 120 can be located at the point where the linear surface of the rake face 116 meets the curved surface of the first section 114A of the gullet 114. In one example, the notch 120 is defined as the transition from a linear surface to a curved surface. The position or depth 124 of the notch 120 along each tooth 102-106 can be a function of the gullet depth D. For example, the position or depth 124 of the notch 120 on each tooth 102-106 can be anywhere in the range of substantially (0.45*D) to substantially (0.49*D) down vertically from the tip 112 of each tooth 102-106 and more preferably anywhere in the range of substantially (0.466*D) to substantially (0.476*D) down vertically from the tip 112 of each tooth 102-106.

Figure 5:
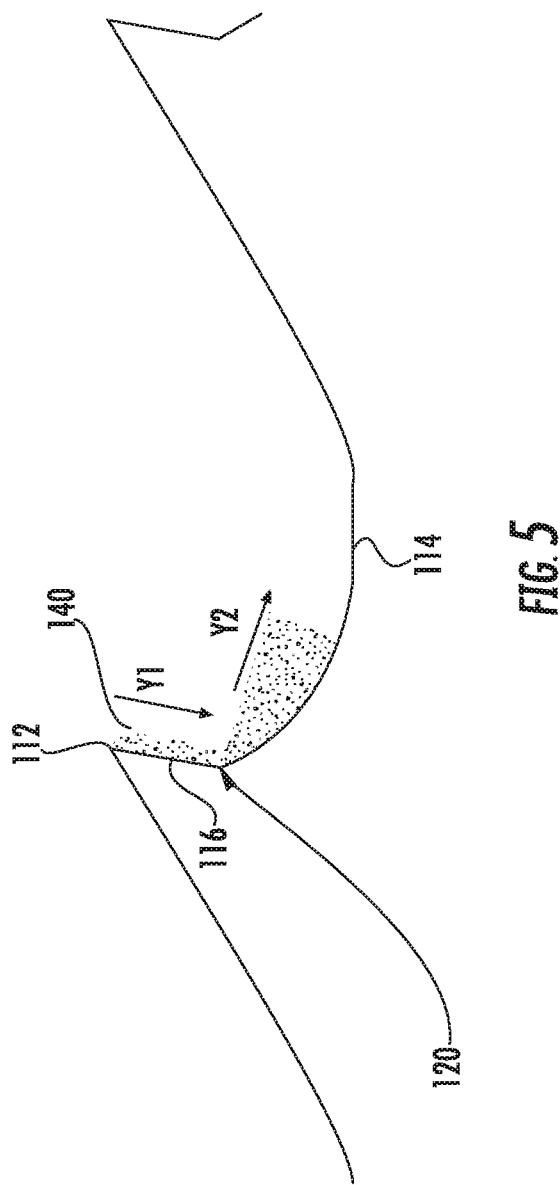
FIG. 5 is another partial side elevation view of the saw blade tooth used in conjunction with the wood-cutting band saw blade of FIG. 1 showing how dust is directed into the gullet area of each tooth according to one example embodiment of the disclosure.

The notch 120 can promote the movement of the dust or swarf generated by the tooth tip 112 cutting into the work piece (e.g., wood) down along the rake face 116 and into the gullet 114 and limit the amount of swarf that falls to the sides of each tooth 102-106 and blade body 110 while still within the work piece where it can be subsequently reapplied along the walls of the work piece. FIG. 5 is a partial side elevation view of the saw blade 100 showing how dust or swarf is directed into the gullet area 114 of each tooth 102-106 with the notch 120. Referring to FIGS. 1 and 5, the dust or swarf 140 is cut from the work piece by the tooth tip 112 engaging the work piece (e.g., wood, metal, alloy, composite). The swarf 140 moves down the rake face 116 in the direction Y1. The movement of the swarf 140 down the rake face 116 in the direction Y1 can be promoted by the rake face 116 having a positive rake angle as discussed above. The swarf 140 reaches the notch 120 and is pushed forward into the gullet 114 in the direction Y2 and towards the flat bottom section 114B of the gullet 114 as discussed above. The movement of the swarf in the direction Y2 is promoted based at least in part on the positive rake angle for the rake face 116 and the disposition of the linear rake face to the curved gullet section 114A, which helps to push the swarf forward into the lower portion of the gullet 114. A larger portion of the swarf 140 having been moved into the gullet 114 can stay within the gullet area 114 until the saw blade 100 exits the work piece, at which point the swarf can fall out of the gullet 114 without re-adhering to the work piece.

Referring again to FIGS. 1-3, the example relief surface 118 of the band saw blade 100 can be a linear surface or substantially linear surface having a first end and a distal second end. The first end of the relief surface 118 can be at the tooth tip 112 and extend angularly generally downward along the back side of the tooth 102-106 towards the gullet 114 in a direction opposite that of the cutting direction X. The second end of the relief surface 118 can generally be positioned at a junction with the gullet 114, such as, for example, at a junction with the third section 114C of the gullet 114. The relief surface 118 can have relief angle A2 measured from a plane extending parallel to the cutting direction X of the band saw blade 100. In one example embodiment, the relief angle A2 can be anywhere in the range of between substantially 10 degrees and substantially 45 degrees below the plane extending parallel to the cutting direction X of the band saw blade 100 and preferably between substantially 15 degrees and substantially 35 degrees below the plane extending parallel to the cutting direction X of the band saw blade 100, and more preferably substantially 25 degrees below the plane extending parallel to the cutting direction X of the band saw blade 100. As discussed above, while the example embodiment shows a single relief surface 118, in other example embodiments, the saw blade 100 can be two, three or more relief surfaces connected to one another and at least one having a different angle with respect to the plane extending parallel to the cutting direction X of the band saw blade 100 and the line defined by the cutting edge 101.

Figure 4:
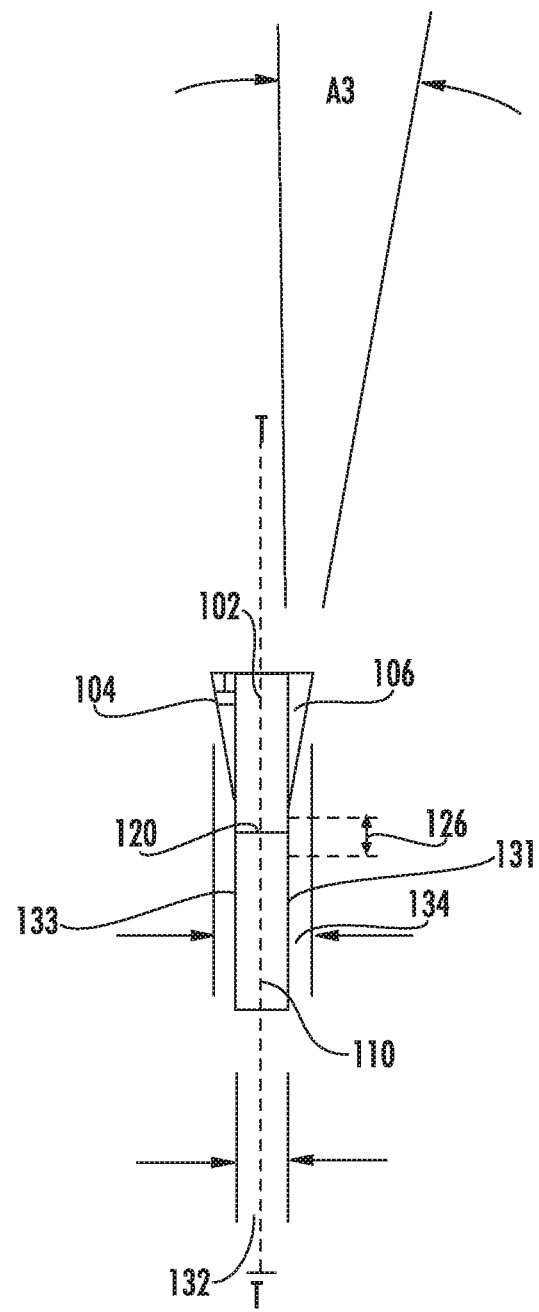
FIG. 4 is a partial front elevation view of the wood-cutting band saw blade of FIG. 1 according to one example embodiment of the disclosure.
Figure 6:
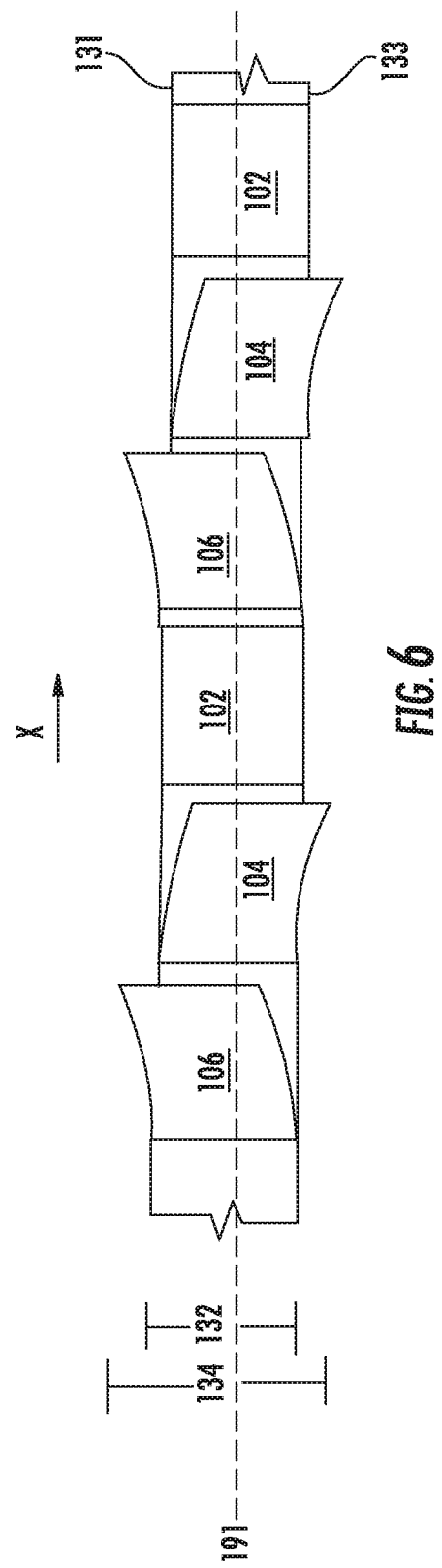
FIG. 6 is a partial top view of the saw blade of FIG. 1 according to one example embodiment of the disclosure.

FIG. 4 is a partial front elevation view of the band saw blade 100 of FIG. 1 according to one example embodiment of the disclosure. FIG. 6 is a partial top view of the band saw blade 100 of FIG. 1 according to one example embodiment of the disclosure. Now referring to FIGS. 1-4 and 6, the example band saw blade 100 can include a repeating three-tooth pattern in certain example embodiments. In one example of the tooth pattern, as shown in FIG. 6, the first tooth 102 is followed by the second tooth 104, which is followed by the third tooth 106, which is followed by the pattern repeating again starting with the first tooth 102 in the opposite of cutting direction X of the band saw blade 100. However, other patterns are within the scope and spirit of this disclosure. For example, in another example embodiment, the pattern can include multiples of any one or more of the teeth 102-106 and or the order of the teeth can be rearranged in any fashion.

The blade body 110 or backing of the band saw blade 100 has a thickness 132 defined by the right side edge 131 and the left side edge 133 of the blade body 110. In one example embodiment, the thickness 132 of the blade body 110 can be between substantially 0.025 inches and substantially 0.070 inches and more preferably between substantially 0.035 inches and substantially 0.055 inches. Further, in the example embodiment shown and described with reference to FIGS. 4 and 6, the maximum set amounts can be the same for the teeth 104, 106 that are offset both to the right and to the left of the blade body 110. In certain example embodiments, the combination of blade body thickness 132 and maximum set in each direction, (i.e., the kerf width 134) can be a function of the thickness 132 or (T) of the blade body 110. In one example, the kerf width 134 of the blade body 110 can be between substantially (1.6*T) to substantially (2.5*T) and more preferably between substantially (1.8*T) to substantially (2.3*T).

In the three-tooth pattern of the example embodiment of FIGS. 1-6, the first tooth 102 is a raker or unset tooth and is aligned with a centerline 191 of the blade body 110 and its outer edges do not extend outside of the right 131 and left 133 sides of the blade body 110.

The second tooth 104 is a set tooth that is offset to a first side of the centerline 191 of the blade body 110. In one example, the first side is the left side of the centerline 191, as shown in FIG. 6, and the second tooth 104 extends out from the left side edge 133 of the blade body 110 by a first offset distance. In one example, the second tooth 104 is offset to the left side of the centerline 191 of the blade body 110 by the first offset distance of anywhere in the range of between substantially 0.014 inches to substantially 0.036 inches. In one example, the tip 112 of second tooth 104 is bent or offset from the blade body to the left of the centerline 191 at an offset angle A3, as shown in FIG. 4. The offset angle A3 is the angle at which left side of the tooth 102-106 is offset with respect to the vertical side wall of the right side edge 133 or left side edge 131 of the blade body 110. In one example embodiment, the offset angle A3 is between substantially 9.5 degrees and substantially 10.5 degrees with respect to transverse axis T and preferably between substantially 9.75 degrees and substantially 10.25 degrees with respect to transverse axis T, and more preferably, substantially 9.98 degrees with respect to transverse axis T.

The third tooth 106 is a set tooth that is offset to an opposite, second side of the centerline 191 of the blade body 110 of the set for the second tooth 104. In one example, the second side is to the right of the centerline 191 and the third tooth 106 extends out from the right side edge 131 of the blade body 110 by a second offset distance. In one example, the second offset distance is equal to the first offset distance for the second tooth 104 and can be offset to the right side of the centerline 191 at a distance of anywhere in the range of between substantially 0.014 inches to substantially 0.036 inches. In one example, the tip 112 of third tooth 106 is bent or offset from the blade body to the right of the centerline 191 at an offset angle that is equal to the offset angle A3, as shown in FIG. 4. In one example embodiment, the offset angle A3 is between substantially 9.5 degrees and substantially 10.5 degrees with respect to transverse axis T, and preferably between substantially 9.75 degrees and substantially 10.25 degrees with respect to transverse axis T, and more preferably, substantially 9.98 degrees with respect to transverse axis T.

As described above, each unset tooth is followed by a left set tooth and then a right set tooth. However, this is for example purposes only as the unset tooth could alternatively be followed by a right set tooth and then a left set tooth. In addition, other combinations of set and unset teeth could be used and are within the scope and spirit of this disclosure. For example, U.S. Pat. No. 6,276,248, titled "Band Saw Blade Having Reduced Noise and Uniform Tooth Loading Characteristics" and hereby incorporated herein by reference for all purposes as part of this disclosure, describes several tooth patterns that may include variously setting primary, secondary, and tertiary teeth in such a manner as to minimize noise and vibration of the band saw blade.

Each example tooth 104, 106 that is a set tooth, either to the right side or the left side of the centerline 191 of the blade body 110, as discussed above with regard to FIGS. 4 and 6, may be angled or set to angle A3 along a bend plane that is parallel with the longitudinal axis L of the band saw blade 100 and provided within a bend plane range 126 along each tooth 104, 106 as shown in FIG. 3. For example, the bend plane can be a plane along which each tooth is bent with respect to the transverse axis T. The bend plane range 126 can extend vertically up and down from the notch 120 and includes the notch 120. For example, the bend plane can be anywhere in the range of within a first distance 128 vertically up from the distance 124 of the notch 120 from the tip 112 and within a second distance 130 vertically down from the distance 124 of the notch 120 from the tooth tip 112. In certain example embodiments, the position or depth of the bend plane along each tooth 104, 106 can be a function of the gullet depth D and the pitch P. For example, the position or depth of the bend plane can be anywhere in the range of substantially (−0.03*P)+depth 124 of the notch 120 down vertically from the tip 112 of each tooth 104, 106 to substantially (0.03*P)+the depth 124 of the notch 120 down vertically from the tip 112 of each tooth 104, 106 and the bend plane range 126 extends from substantially (−0.03*P)+depth 124 of the notch 120 down vertically from the tip 112 of each tooth 104, 106 to substantially (0.03*P)+ the depth 124 of the notch 120 down vertically from the tip 112 of each tooth 104, 106. As discussed above, the depth 124 of the notch 120 on each tooth 104, 106 can be anywhere in the range of substantially (0.45*D) to substantially (0.49*D) down vertically from the tip 112 of each tooth 104, 106 and more preferably anywhere in the range of substantially (0.466*D) to substantially (0.476*D) down vertically from the tip 112 of each tooth 104, 106. Accordingly, in one example embodiment, the bend plane range can extend from substantially ((−0.03*P)+(0.466*D)) to substantially ((0.03*P)+(0.476*D)) down vertically from the tip 112 of each tooth 104, 106.

Thus, in certain example embodiments, the band saw blade 100 can have a repeating set tooth pattern that includes a substantially constant pitch distance, a substantially constant gullet depth, variable offset, and substantially constant offset difference. While the example embodiment is shown and described as a three-tooth repeating pattern, the repeating pattern can include fewer or greater than three teeth 102-106. Further, in other example embodiments, one or more of the pitch distance and gullet depth may be variable rather than constant for all teeth 102-106 of the band saw blade 100.

Although example embodiments have been described in language specific to structural features and/or methodological acts, it is to be understood that the disclosure is not necessarily limited to the specific features or acts described. Rather, the specific features and acts are disclosed as illustrative forms of implementing the example embodiments. Conditional language, such as, among others, "can," "could," "might," or "may," unless specifically stated otherwise, or otherwise understood within the context as used, is generally intended to convey that certain example embodiments could include, while other example embodiments do not include, certain features, elements, and/or steps. Thus, such conditional language is not generally intended to imply that features, elements, and/or steps are in any way required for one or more embodiments.

What is claimed is:

1. A band saw blade comprising:
a blade body comprising a back edge;
a cutting edge disposed on an opposite side of the blade body from the back edge, the cutting edge being defined by a plurality of teeth spaced relative to each other and extending along the blade body, each of the plurality of teeth comprising:
a tip;
a substantially linear rake face located on a first side of the tip;
a relief surface located on a second side of the tip opposite the first side;
a gullet located adjacent to the rake face and having a gullet depth, wherein D is the gullet depth; and
a notch located on the first side of the tip and defined by a junction of the rake face and the gullet, wherein the notch is located along the first side of the tip at a notch depth in the range of substantially 0.45D to substantially 0.49D down vertically from the tip of the respective one of the plurality of teeth.

2. The band saw blade of claim 1, wherein a distance from the back edge of the blade body to the tip of at least one of the plurality of teeth is less than or equal to three inches.

3. The band saw blade of claim 1, wherein the gullet comprises:
a first curved section extending from the rake face;
a substantially linear section extending from the first curved section, wherein the substantially linear section extends substantially parallel to the back edge of the blade body;
a second curved section extending from the substantially linear section to a second relief surface of a preceding tooth in a cutting direction of the band saw blade;
wherein the gullet depth is a distance between the tip and the substantially linear section of the gullet.

4. The band saw blade of claim 1, wherein each of the plurality of teeth have a pitch (P) defined as the distance from a tip of a first tooth to a second tip of a second tooth immediately adjacent to the first tooth in a cutting direction of the band saw blade, wherein the gullet depth D is within the range of substantially 0.30P to substantially 0.36P, wherein P is the pitch.

5. The band saw blade of claim 4, wherein the gullet depth D is within the range of substantially 0.31P to substantially 0.34P.

6. The band saw blade of claim 4, wherein the pitch is constant for the plurality of teeth of the band saw blade.

7. The band saw blade of claim 4, wherein the plurality of teeth further comprise a plurality of set teeth and a plurality of unset teeth, wherein the set teeth are alternately set in directions on opposing sides of the cutting edge.

8. The band saw blade of claim 7, wherein each of the plurality of set teeth is set at an offset angle A3 in the range of substantially 9.5 degrees to substantially 10.5 degrees to a transverse axis of the blade body.

9. The band saw blade of claim 8, wherein the offset angle is substantially 9.98 degrees.

10. The band saw blade of claim 8, wherein each of the plurality of set teeth further comprises a bend plane from which each respective set tooth of the plurality of set teeth is set, the bend plane extending substantially parallel to the back edge of the blade body.

11. The band saw blade of claim 10, wherein the bend plane for each of the plurality of set teeth is disposed in a range of substantially −0.03P+0.45D to substantially 0.03P+0.49D down vertically from the tip of each respective set tooth of the plurality of set teeth.

12. The band saw blade of claim 8, wherein the blade body has a thickness defined as a distance from a left side to a right side of the blade body and wherein the band saw blade further comprise a kerf width within the range of substantially 1.8T to substantially 2.3T, wherein T is the thickness of the blade body.

13. The band saw blade of claim 7, wherein the plurality of teeth have a repeating pattern of one unset tooth and two set teeth for the plurality of teeth.

14. The band saw blade of claim 1, wherein the notch depth is in the range of substantially 0.466D to substantially 0.476D down vertically from the tip of the respective one of the plurality of teeth.

15. The band saw blade of claim 1, wherein the rake face extends from the tip in a direction opposite to a cutting direction of the band saw blade and is disposed at a rake angle with respect to a transverse axis of the band saw blade, wherein the rake angle is in the range of substantially 5 degrees to substantially 15 degrees.

16. A band saw blade comprising:
a blade body comprising a substantially planar back edge;
a cutting edge disposed on an opposite side of the blade body from the back edge, the cutting edge being defined by a plurality of teeth spaced relative to each other and extending along the blade body, each of the plurality of teeth comprising:
a tip wherein each of the plurality of teeth have a pitch defined as the distance from a tip of a first tooth to a second tip of a second tooth immediately adjacent to the first tooth in a cutting direction of the band saw blade;
a substantially linear rake face located on a front side of the tip in a cutting direction and extending from the tip in a direction generally opposite the cutting direction;
a substantially linear relief surface located on an opposing rear side of the tip opposite the front side and extending from the tip in the direction opposite the cutting direction;
a gullet located adjacent to the rake face and having a gullet depth within the range of substantially 0.31P to substantially 0.34P, wherein P is the pitch; and
a notch located on the first side of the tip and defined by a junction of the rake face and the gullet, wherein the notch is located along the first side of the tip at a notch depth in the range of substantially 0.45D to substantially 0.49D down vertically from the tip of the respective one of the plurality of teeth, wherein D is the gullet depth, and
wherein a distance from the back edge of the blade body to the tip of at least one of the plurality of teeth is less than or equal to three inches.

17. The band saw blade of claim 16, wherein the plurality of teeth further comprise a plurality of set teeth and a plurality of unset teeth, wherein the set teeth are alternately set in directions on opposing sides of the cutting edge at an offset angle A3 in the range of substantially 9.5 degrees to substantially 10.5 degrees to a transverse axis of the blade body.

18. The band saw blade of claim 17, wherein each of the plurality of set teeth further comprises a bend plane from which each respective set tooth of the plurality of set teeth is set, the bend plane extending substantially parallel to the back edge of the blade body and disposed in a range of substantially −0.03P+0.45D to substantially 0.03P+0.49D down vertically from the tip of each respective set tooth of the plurality of set teeth.

19. The band saw blade of claim 16, wherein the blade body has a thickness defined as a distance from a left side to a right side of the blade body and wherein the band saw blade further comprise a kerf width within the range of substantially 1.8T to substantially 2.3T, wherein T is the thickness of the blade body.

20. The band saw blade of claim 16, wherein the gullet comprises:
- a first curved section extending from the rake face;
- a substantially linear section extending from the first curved section, wherein the substantially linear section extends substantially parallel to the back edge of the blade body;
- a second curved section extending from the substantially linear section to a second relief surface of a preceding tooth in the cutting direction of the band saw blade;
- wherein the gullet depth is a distance between the tip and the substantially linear section of the gullet.

\* \* \* \* \*